(12) United States Patent
Hong et al.

(10) Patent No.: US 11,105,910 B2
(45) Date of Patent: Aug. 31, 2021

(54) SYSTEMS AND METHODS FOR VIRTUAL APERATURE RADAR TRACKING

(71) Applicant: Oculii Corp., Beavercreek, OH (US)

(72) Inventors: Lang Hong, Beavercreek, OH (US); Steven Hong, Sunnyvale, CA (US)

(73) Assignee: Oculii Corp., Beavercreek, OH (US)

( * ) Notice: Subject to any disclaimer, the term of this patent is extended or adjusted under 35 U.S.C. 154(b) by 0 days.

(21) Appl. No.: 16/670,824

(22) Filed: Oct. 31, 2019

(65) Prior Publication Data

US 2020/0064462 A1 Feb. 27, 2020

Related U.S. Application Data

(63) Continuation of application No. 16/032,369, filed on Jul. 11, 2018, now Pat. No. 10,509,119, which is a
(Continued)

(51) Int. Cl.
*G01S 13/00* (2006.01)
*G01S 13/72* (2006.01)
(Continued)

(52) U.S. Cl.
CPC .............. *G01S 13/003* (2013.01); *G01S 7/42* (2013.01); *G01S 13/723* (2013.01); *G01S 13/90* (2013.01);
(Continued)

(58) Field of Classification Search
CPC ........ G01S 7/2813; G01S 7/42; G01S 13/325; G01S 13/89; G01S 3/74; G01S 7/52019;
(Continued)

(56) References Cited

U.S. PATENT DOCUMENTS 3,978,482 A * 8/1976 Williams .................. G01S 7/14
342/142
4,246,585 A * 1/1981 Mailloux ............. H01Q 3/2611
342/373
(Continued)

FOREIGN PATENT DOCUMENTS

JP 2020159848 A 10/2020

OTHER PUBLICATIONS

Li , et al., "Target Tracking in Uncertain Multipath Environment using Distributed Angle-of-Arrival Observation", retrieved from online on Apr. 4, 201 (Apr. 4, 2018); retrieved from URL:http://ieeexplore.ieee.org/document/7131228.
(Continued)

*Primary Examiner* — Peter M Bythrow
(74) *Attorney, Agent, or Firm* — Jeffrey Schox; Samuel Rosenthal

(57) ABSTRACT

A system for virtual aperture array radar tracking includes a transmitter that transmits first and second probe signals; a receiver array including a first plurality of radar elements positioned along a first radar axis; and a signal processor that calculates a target range from first and second reflected probe signals, corresponds signal instances of the first reflected probe signal to physical receiver elements of the radar array, corresponds signal instances of the second reflected probe signal to virtual elements of the radar array, calculates a first target angle between a first reference vector and a first projected target vector from the first reflected probe signal, and calculates a position of the tracking target relative to the radar array from the target range and first target angle.

20 Claims, 11 Drawing Sheets

Related U.S. Application Data continuation of application No. 15/883,372, filed on Jan. 30, 2018, now Pat. No. 10,048,366.

(51) Int. Cl.

| | | |
|---|---|---|
| *G01S 7/42* | (2006.01) | |
| *G01S 13/90* | (2006.01) | |
| *G01S 13/44* | (2006.01) | |
| *G01S 7/52* | (2006.01) | |
| *G01S 13/86* | (2006.01) | |
| *G01S 13/931* | (2020.01) | |
| *G01S 13/66* | (2006.01) | |
| *G01S 13/02* | (2006.01) | |
| *G01S 15/66* | (2006.01) | |

(52) U.S. Cl.
CPC ........ *G01S 7/52019* (2013.01); *G01S 7/52023* (2013.01); *G01S 13/4463* (2013.01); *G01S 13/66* (2013.01); *G01S 13/86* (2013.01); *G01S 13/931* (2013.01); *G01S 15/66* (2013.01); *G01S 2013/0263* (2013.01); *G01S 2013/932* (2020.01); *G01S 2013/9316* (2020.01); *G01S 2013/9322* (2020.01); *G01S 2013/9323* (2020.01); *G01S 2013/9324* (2020.01)

(58) Field of Classification Search
CPC .... G01S 13/282; G01S 13/4463; G01S 13/90; G01S 2013/0254
See application file for complete search history.

(56) References Cited

U.S. PATENT DOCUMENTS

| | | | | | |
|---|---|---|---|---|---|
| 4,996,532 | A * | 2/1991 | Kirimoto | ................... | G01S 7/36 342/17 |
| 5,218,359 | A * | 6/1993 | Minamisono | ............ | G01S 3/30 342/378 |
| 5,278,757 | A * | 1/1994 | Hoctor | ................ | G01S 15/8997 600/459 |
| 7,535,409 | B1 | 5/2009 | Choe et al. | | |
| 7,609,198 | B2 * | 10/2009 | Chang | ................. | G01S 13/9023 342/59 |
| 8,312,771 | B2 * | 11/2012 | Randall | .................... | A61B 8/56 73/627 |
| 8,482,455 | B2 * | 7/2013 | Kemkemian | ......... | G01S 13/003 342/107 |
| 9,470,782 | B2 * | 10/2016 | Millar | ...................... | G01S 7/02 |
| 9,869,762 | B1 | 1/2018 | Alland et al. | | |
| 10,048,366 | B1 | 8/2018 | Hong et al. | | |
| 10,509,119 | B2 * | 12/2019 | Hong | .................... | G01S 13/003 |
| 2004/0178951 | A1 * | 9/2004 | Ponsford | .................. | G01S 3/74 342/192 |
| 2007/0013575 | A1 * | 1/2007 | Lee | ........................ | G01S 7/2813 342/52 |
| 2007/0285315 | A1 * | 12/2007 | Davis | ................... | H01Q 3/2629 342/377 |
| 2008/0122681 | A1 * | 5/2008 | Shirakawa | ................ | G01S 3/74 342/147 |
| 2008/0291077 | A1 * | 11/2008 | Chang | ................. | G01S 13/9023 342/59 |
| 2009/0174590 | A1 | 7/2009 | Huizing et al. | | |
| 2009/0201206 | A1 * | 8/2009 | Li | ......................... | G01S 7/2813 342/373 |
| 2010/0019954 | A1 * | 1/2010 | Mizutani | ................ | H01Q 21/22 342/147 |
| 2010/0156701 | A1 * | 6/2010 | Shirakawa | ................ | G01S 3/74 342/118 |
| 2010/0194629 | A1 * | 8/2010 | Craig | ....................... | H01Q 3/26 342/354 |
| 2010/0220001 | A1 | 9/2010 | Longstaff | | |
| 2010/0328157 | A1 * | 12/2010 | Culkin | ................. | H01Q 21/061 342/372 |
| 2011/0050500 | A1 * | 3/2011 | Shirakawa | ................ | G01S 3/74 342/378 |
| 2012/0112954 | A1 * | 5/2012 | Kurono | ..................... | G01S 3/74 342/147 |
| 2012/0268309 | A1 | 10/2012 | Samuel et al. | | |
| 2012/0299773 | A1 * | 11/2012 | Stirling-Gallacher | ... | H01Q 3/34 342/368 |
| 2013/0069818 | A1 | 3/2013 | Shirakawa et al. | | |
| 2013/0120191 | A1 | 5/2013 | Zhang et al. | | |
| 2013/0300596 | A1 | 11/2013 | Shirakawa | | |
| 2015/0102954 | A1 | 4/2015 | Hong | | |
| 2015/0270609 | A1 * | 9/2015 | Jin | .......................... | H01Q 3/30 342/372 |
| 2017/0082730 | A1 * | 3/2017 | Kishigami | .......... | H01Q 21/061 |
| 2017/0141454 | A1 | 5/2017 | Welle | | |
| 2017/0212213 | A1 * | 7/2017 | Kishigami | ............. | G01S 13/04 |
| 2018/0024235 | A1 | 1/2018 | Hong et al. | | |
| 2018/0088224 | A1 | 3/2018 | Kishigami | | |

OTHER PUBLICATIONS

Korean Office Action for application No. 10-2020-7018559, dated May 21, 2021.

Chen, Qingchao, et al., "A coherent through-wall MIMO phased array imaging radar based on time-duplexed switching", Proceedings of SPIE, SPIE Defense + Security, 2017, Anaheim, California, United States.

Japanese Office Action for application No. JP2020-537710 dated Jun. 22, 2021.

\* cited by examiner

100

```
┌─────────────────────────────────────────────────────────┐
│         Transmitting probe signals S110                 │
└─────────────────────────────────────────────────────────┘
┌─────────────────────────────────────────────────────────┐
│      Receiving reflected probe signals S120             │
└─────────────────────────────────────────────────────────┘
┌─────────────────────────────────────────────────────────┐
│   Calculating initial tracking parameters S130          │
│  ┌───────────────────────────────────────────────────┐  │
│  │  Linking signal instances to receiver elements S131│  │
│  └───────────────────────────────────────────────────┘  │
│  ┌───────────────────────────────────────────────────┐  │
│  │         Performing beamforming S132                │  │
│  └───────────────────────────────────────────────────┘  │
└─────────────────────────────────────────────────────────┘
┌─────────────────────────────────────────────────────────┐
│      Refining initial tracking parameters S140          │
└─────────────────────────────────────────────────────────┘
┌─────────────────────────────────────────────────────────┐
│     Modifying probe signal characteristics S150         │
└─────────────────────────────────────────────────────────┘
```

FIGURE 2

SYSTEMS AND METHODS FOR VIRTUAL APERATURE RADAR TRACKING

CROSS-REFERENCE TO RELATED APPLICATIONS

This application is a continuation of U.S. patent application Ser. No. 16/032,369 filed 11 Jul. 2018, which is a continuation of U.S. patent application Ser. No. 15/883,372, filed on 30 Jan. 2018 (U.S. Pat. No. 10,048,366 issued 14 Aug. 2018), which are incorporated in their entirety by this reference.

TECHNICAL FIELD

This invention relates generally to the radar field, and more specifically to new and useful systems and methods for virtual aperture radar tracking.

BACKGROUND

Traditional array-based receivers calculate azimuth and/or elevation by measuring the time or phase difference between received probe signals at different receivers (or antennas) within the array(s), as shown in FIG. 1 (1D array), using beamforming (e.g., digital beamforming). Similar effects may be produced using a transmit array instead of a receiver array. These traditional solutions are limited: angular resolution depends both on the number of elements in the array and the angle between the array and the target:

$$\theta_{resolution} \approx \frac{\lambda}{Nd\cos\theta}$$

where N is the number of elements in the array and d is the distance separating them.

Thus, there is a need in the radar field to create new and useful systems and methods for virtual aperture radar tracking. This invention provides such new and useful systems and methods.

BRIEF DESCRIPTION OF THE FIGURES

FIG. 2 is chart view of a method of an invention embodiment;

DESCRIPTION OF THE INVENTION EMBODIMENTS

The following description of the invention embodiments of the invention is not intended to limit the invention to these invention embodiments, but rather to enable any person skilled in the art to make and use this invention.

1. Method for Virtual Aperture Array Radar Tracking

A method 100 for virtual aperture array (VAA) radar tracking includes transmitting a set of probe signals S110, receiving a set of reflected probe signals S120, and calculating initial tracking parameters from the set of reflected probe signals S130, as shown in FIG. 2. The method 100 may additionally include refining the initial tracking parameters S140 and/or modifying probe signal characteristics S150.

As discussed in the background section, traditional array-based radar systems are limited: angular resolution depends both on the number of elements in the receiver array and the angle between the array and the target:

$$\theta_{resolution} \approx \frac{\lambda}{Nd\cos\theta}$$

where N is the number of elements in the array and d is the distance separating them.

Here, the number of array elements (and distance separating them) relates to the receiver's aperture; that is, more elements (or increased element spacing) results in increased receiver aperture. As the angular resolution formula makes clear, to increase angular resolution (without changing carrier frequency), one must increase the receiver's aperture. Typically, this is done by adding receiver array elements or increasing the separation distance between elements; however, these techniques increase either or both of the receiver array's physical size or its cost and physical complexity. Nevertheless, this traditional technique shines in that it increases radar resolution with relatively little change in processing latency.

Figure 1:
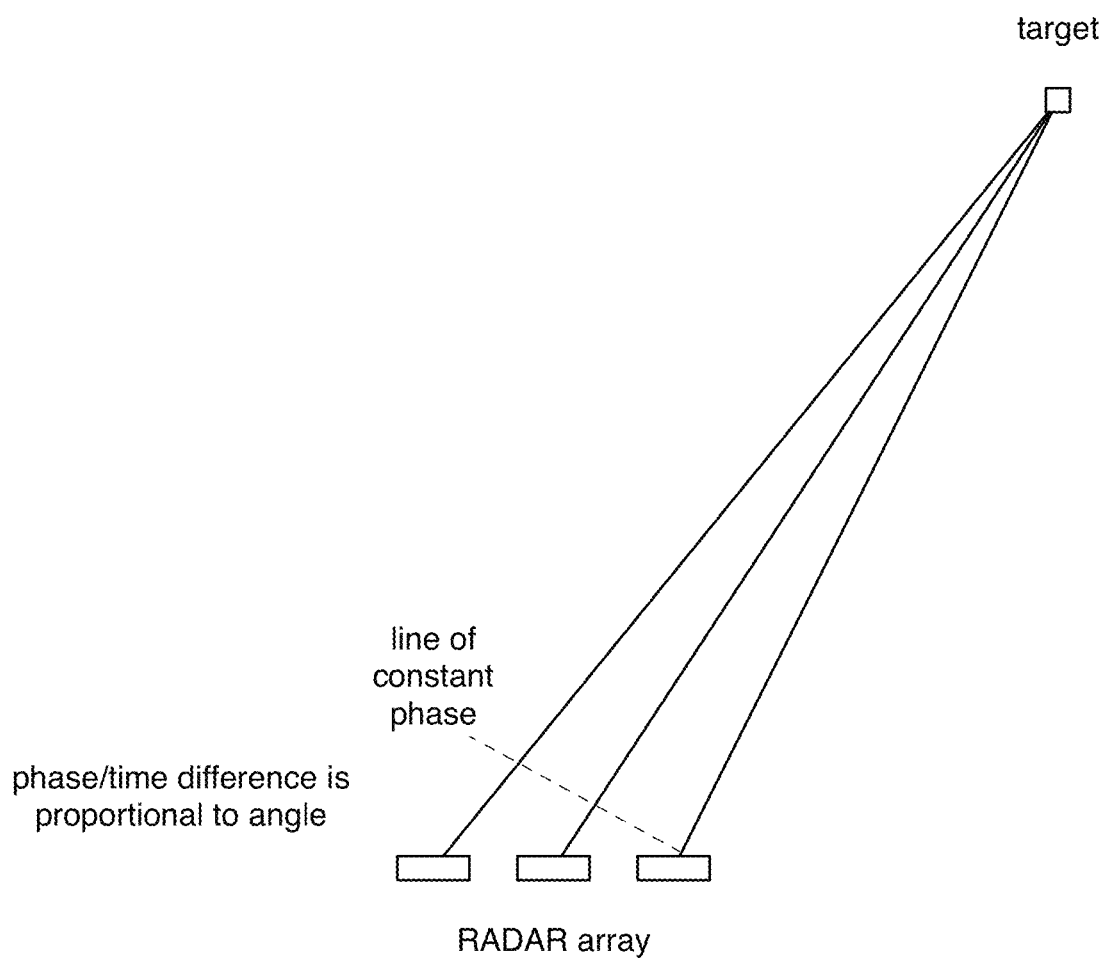
FIG. 1 is a prior art example diagram of a 1D receiver array radar system.
Figure 3A:
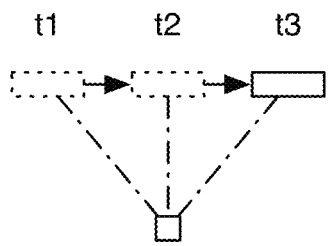
FIG. 3A is an example view of physical aperture in SAR tracking.
Figure 3B:
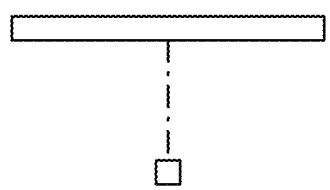
FIG. 3B is an example view of virtual aperture in SAR tracking.

As an alternative to this traditional technique, synthetic aperture radar (SAR) was created. In SAR, a moving antenna (or antenna array) captures multiple signals sequentially as it moves, as shown in FIG. 3A; these signals are then combined (using knowledge of the antenna's movement) to simulate the effect of a larger antenna, as shown in FIG. 3B. SAR manages to simulate increased radar aperture (thus increasing radar resolution), but requires precise antenna motion data and generally entails a significant increase in processing latency. Both requirements are problematic in many applications.

The method 100 utilizes a novel technique to simulate increased radar aperture (as SAR does) without incurring the additional cost/size of increasing physical array size or the heavy downsides of SAR (e.g., motion data requirements and high processing latency). This technique is referred to Virtual Aperture Array (VAA) radar tracking. Note that while the term "virtual aperture" has various uses in the field of radar tracking, as used in the present application, Virtual Aperture Array radar tracking specifically refers to the tracking techniques described herein (and not to any unrelated technology sharing the term).

Figure 4A:
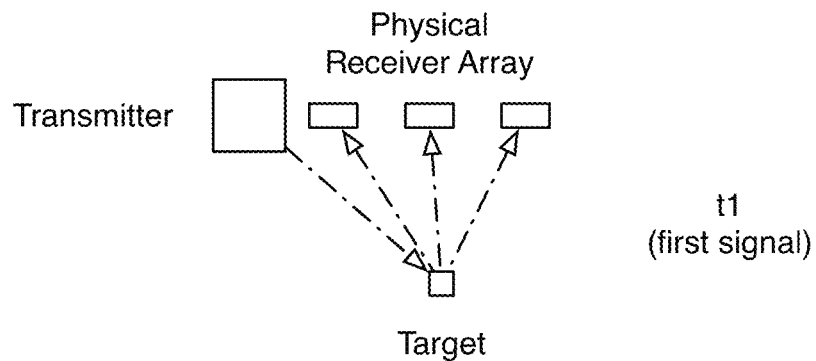
FIG. 4A is an example view of a first physical aperture in VAA tracking.
Figure 4B:
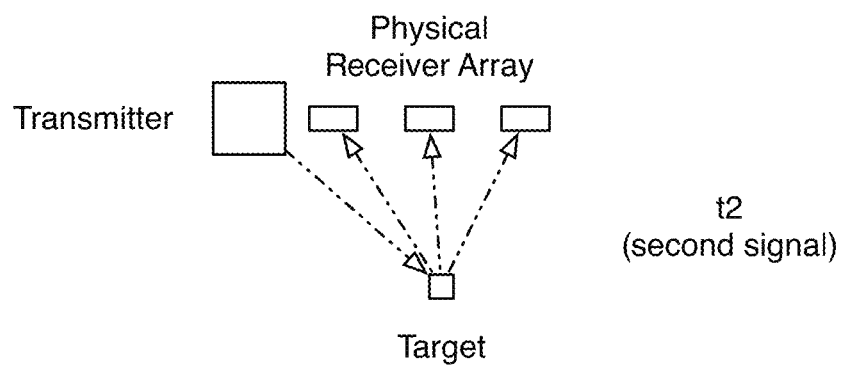
FIG. 4B is an example view of a second physical aperture in VAA tracking.
Figure 4C:
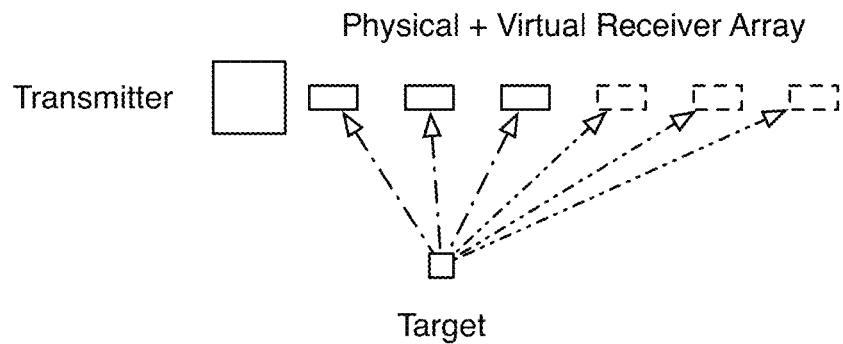
FIG. 4C is an example view of a virtual aperture in VAA tracking.

The VAA radar tracking technique of the method 100 functions by capturing instances of a first signal at a physical array simultaneously (like a traditional phased array), then capturing instances of a second signal at the same physical array (the instances of the second signal captured simultaneously, but not necessarily at the same time as the instances of the first signal are captured); if applicable, capturing additional instances in the same manner, and finally processing the data received from all captured instances together to generate a higher-resolution radar tracking solution than would otherwise be possible. Notably, the first and second signals (as well as any additional signals) are encoded with distinct phase information. This distinct phase information enables the instances of the second signal to be treated as being received at a virtual receiver array displaced from the physical array (creating a virtual aperture larger than the physical aperture). For example, a first signal may be captured as shown in FIG. 4A, having a first phase encoding, and a second signal may be captured as shown in FIG. 4B, having a second phase encoding; these signals may be processed together as shown in FIG. 4C.

Figure 5A:
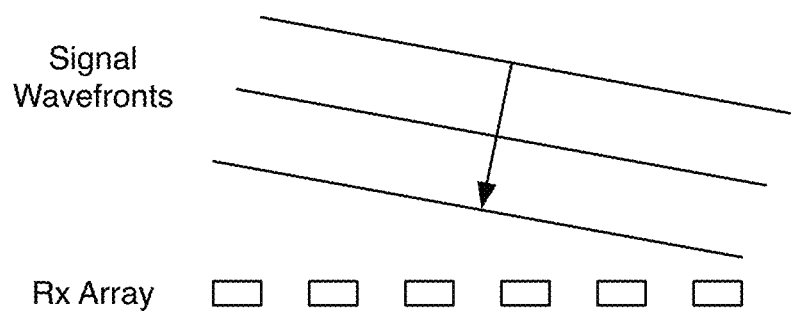
FIG. 5A is a diagram view of a signal incident on a traditional receiver array.
Figure 5B:
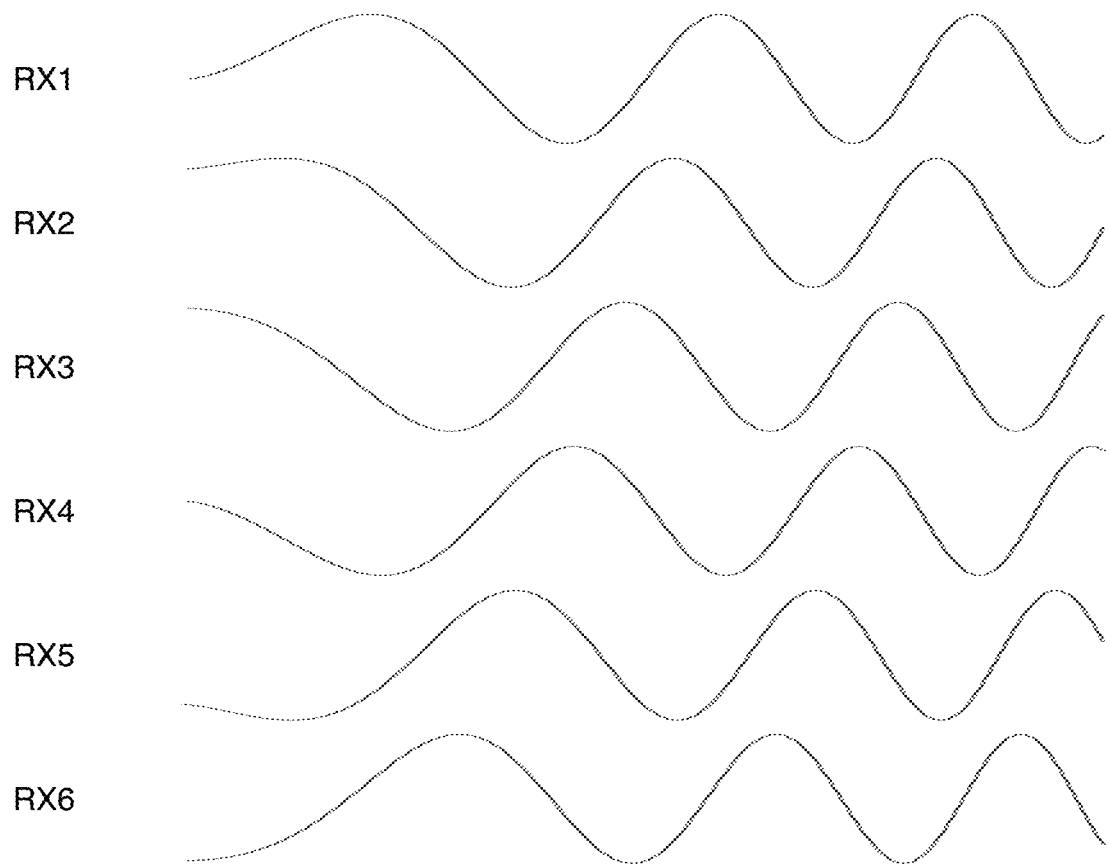
FIG. 5B is a signal view of a signal incident on a traditional receiver array.

As shown in FIG. 5A, when a reflected signal is received from a target at an angle (i.e., not normal to) the six-element radar array, the signal received at each receiver element in the array is phase shifted relative to the signal received at other elements in the array, as shown in FIG. 5B. From the phase shift and spacing between elements, the angle of the target to the array may be determined.

Figure 6A:
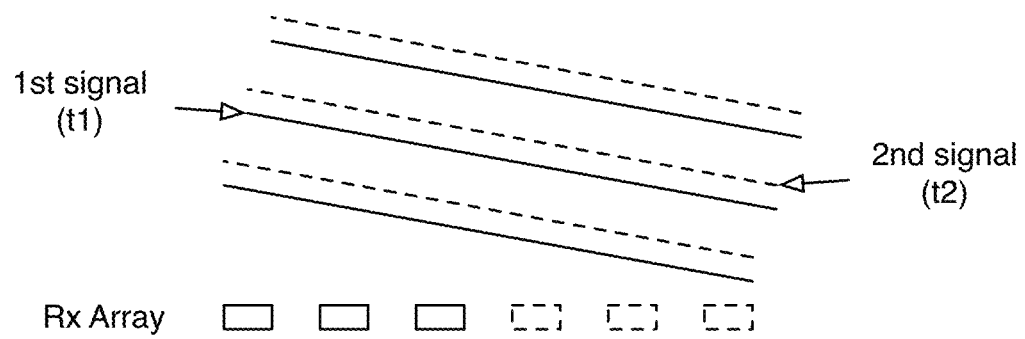
FIG. 6A is a diagram view of a signal incident on a VAA system.
Figure 6B:
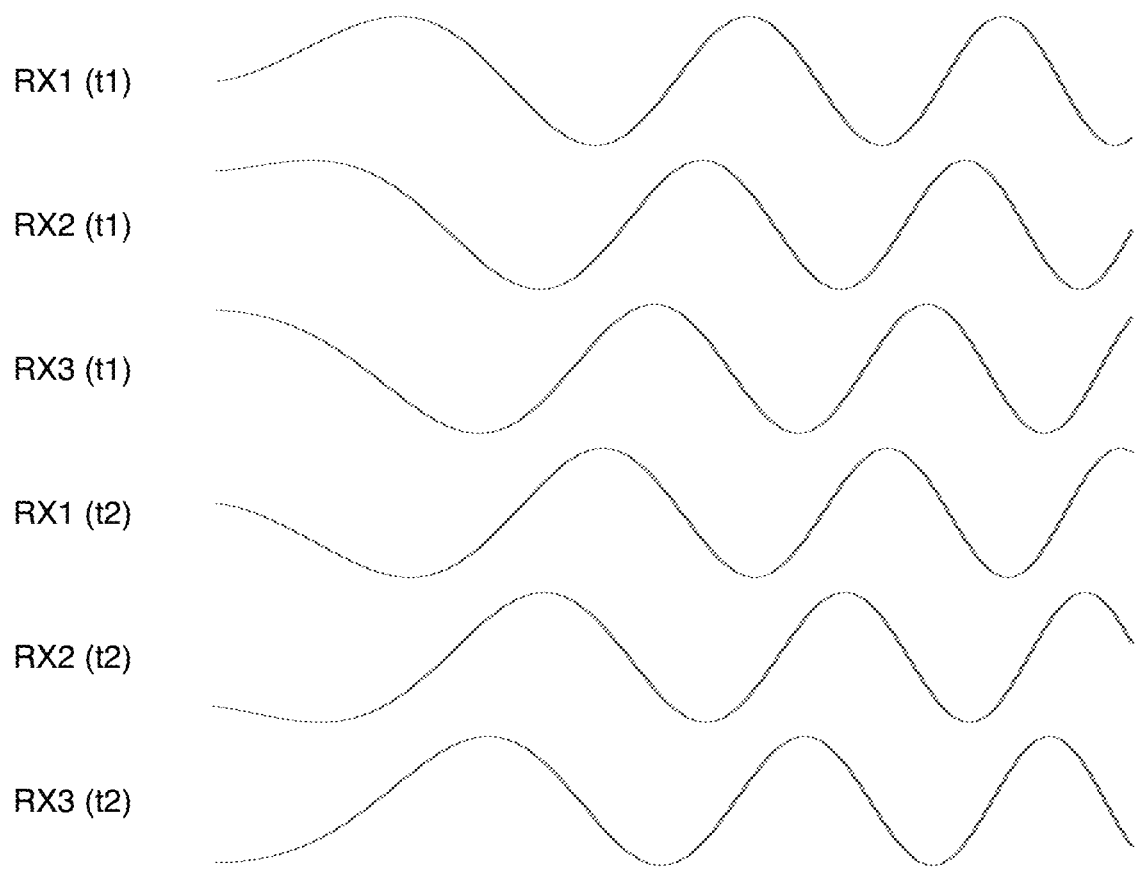
FIG. 6B is a signal view of a signal incident on a VAA system.

As shown in FIG. 6A, the method 200 can simulate the same aperture with only three elements through the use of two phase shifted signals, resulting in the signals at receiver elements as shown in FIG. 6B (note that the signal at RX1 at t2 is similar to the signal at RX4 in FIG. 5B, and so on). The positioning of the "virtual elements" is dependent on the phase shift between the first and second signals.

The method 100 is preferably implemented by a system for VAA radar tracking (e.g., the system 200), but may additionally or alternatively be implemented using any suitable object tracking system capable of performing virtual aperture array object tracking (e.g., SONAR, LIDAR).

S110 includes transmitting a set of probe signals. S110 functions to transmit a set of signals that, after reflection by a target, can provide information about the target (e.g., relative location, velocity, etc.). S110 preferably includes transmitting=frequency shift keyed (FSK) RADAR signals or =frequency-modified continuous wave (FMCW) RADAR signals, but S110 may include transmitting any signal satisfying these constraints; e.g., an electromagnetic signal (as in radio waves in RADAR, infrared/visible/UV waves in LIDAR), a sound signal (as in SONAR).

S110 preferably includes transmitting at least two distinct probe signals. The set of probe signals in S110 preferably satisfy two constraints: each of the set is distinct in phase (as measured from some reference point) and each of the set is distinguishable from other others upon reception. The distinction in phase enables the effective increase of aperture (and thus of angular resolution), while distinguishability ensures that upon reception, signal data is appropriately processed given the distinction in phase.

Figure 7:
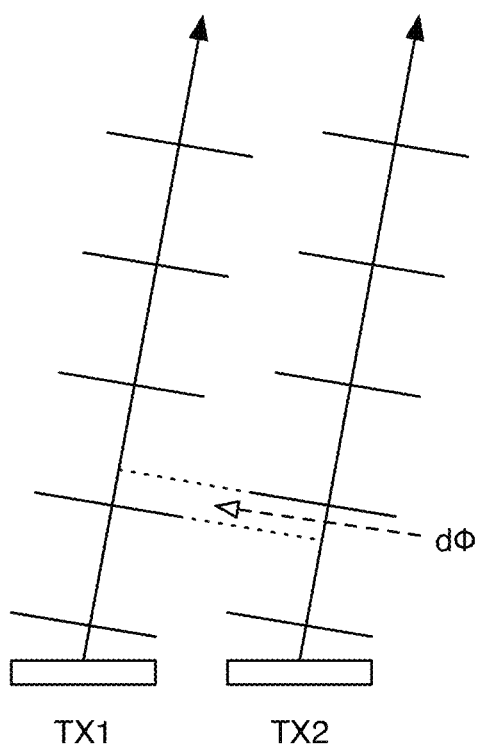
FIG. 7 is an example view of phase shift from two transmitter elements separated by a distance.

S110 may accomplish phase distinction in several manners. For example, S110 may include transmitting probe signals from physically distinct antenna elements. For a target at an angle from the transmitter elements, the separation encodes an inherent phase difference (one that is dependent on the angle!), as shown in FIG. 7. For two transmitters separated by a distance $d_{TX}$, the phase difference at a target at $\theta$ from normal is approximately $$d\phi = \frac{2\pi}{\lambda} d_{TX} \sin\theta$$

and the phase difference seen at the receiver is approximately the same.

Figure 8:
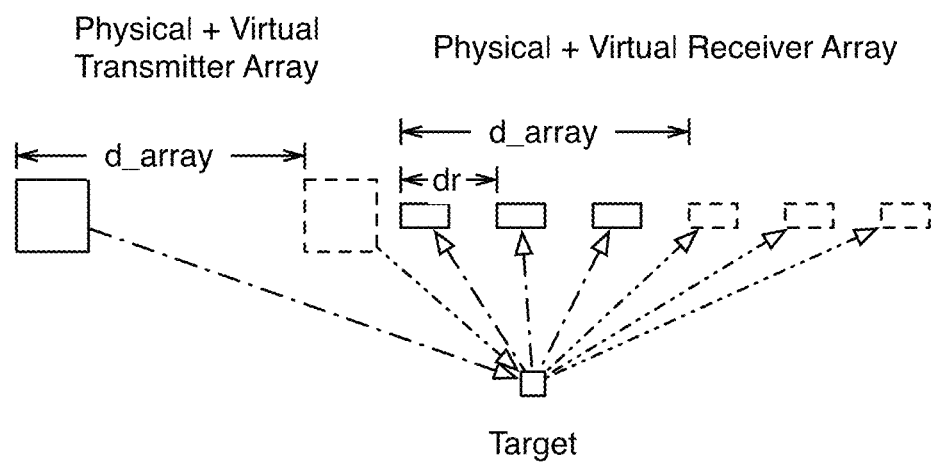
FIG. 8 is a diagram view of virtual transmitter and receiver elements in a VAA system.

As a second example, S110 may include transmitting probe signals at different times from the same antenna element(s), but with different phase information. For example, S110 may include transmitting a first signal from an antenna element at a first time, and then transmitting a second phase shifted signal from the same antenna element at a second time. Note that this is not equivalent to the phase difference in the first example; the phase difference $d\phi$ (between the first and second signal) seen at a target is (approximately) constant and independent of the target's angle. Also note that while this phase distinction results in the simulation of increased receiver elements, it also results in the simulation of increased transmitter elements, as shown in FIG. 8.

The result of this is that while phase distinction is generated by antenna element separation, the size of the virtual aperture is roughly the same for all target angles; in the explicit phase shifting example, the size of the virtual aperture is target-angle dependent. For example, in the transmitter separation case, the array shift can be written as $$d_{array} = d\phi \frac{\lambda}{2\pi} \frac{1}{\sin\theta} = d_{TX}$$

while in the explicit phase shifting case $$d_{array} = d\phi \frac{\lambda}{2\pi} \frac{1}{\sin\theta}$$

where $d\phi$ is a constant (and thus $d_{array}$ is target angle dependent).

While S110 preferably performs explicit phase shifting with a phase shifter (i.e., a device for which phase shift is ideally independent of frequency) S110 may additionally or alternatively perform explicit phase shifting using delay lines (or any other device for which phase shift depends on frequency) and/or any combination of time delays and phase shifters.

S110 may additionally or alternatively include combining phase shifting techniques (e.g., using multiple transmitters separated by a distance and phase-shifting the transmitters relative to one another).

Note that while examples are given with time-constant phase shifts, S110 may additionally or alternatively include modulating phase over time, by physically shifting transmitters (i.e., giving $d_{TX}$ time dependence) and/or by adding phase $d\phi$ where the phase is a function of time. The phase of the transmitted signal over time is referred to as the phase function. Phase functions may be referenced to any points.

For example, if first and second antenna elements (separated by a non-zero distance) produce identical first and second signals respectively, it can be said that the phase function of the first signal (referenced to the first transmitter) is identical to the phase function of the second signal (referenced to the second transmitter). However, the phase of these two signals after reflection by a target at an angle from the transmitter array is not seen as identical at the target (or at the receiver array).

S110 may additionally or alternatively include modulating phase with respect to angle (e.g., by using a steerable or directional antenna and modulating phase while sweeping the antenna, using an antenna array and modulating phase for different elements of the array, etc.).

S110 may also accomplish signal distinguishability in any of several manners. As previously mentioned, one way in which S110 may enable signal distinguishability is by time-duplexing signals (e.g., transmitting a first frequency chirp signal with a first phase encoding, then a second signal with a second phase encoding); however, S110 may additionally or alternatively make signals distinguishable by frequency duplexing signals (e.g., transmitting a first frequency chirp signal within a first frequency band and transmitting a second frequency chirp signal within a second frequency band non-overlapping with the first), or by encoding the signals (e.g., using a distinct frequency modulation or amplitude modulation technique to distinguish a signal from others). S110 may additionally or alternatively accomplish signal distinguishability in any manner.

S120 includes receiving a set of reflected probe signals. S120 functions to receive data resulting from the reflection of the probe signal transmitted in S110. S120 preferably includes measuring phase, magnitude, and frequency information from reflected probe signals, but S120 may additionally or alternatively include measuring any available characteristics of the reflected probe signals.

S120 preferably includes measuring any data necessary to recover signal identification information (i.e., information to determine which signal of the transmitted set the reflected probe signal corresponds to).

S130 includes calculating initial tracking parameters from the set of reflected probe signals. S130 functions to calculate a set of tracking parameters that identify at least a position of the target relative to the radar receiver; additionally or alternatively, tracking parameters may include additional parameters relevant to object tracking (e.g., target velocity, target acceleration). Note that S130 may include calculating more tracking parameters for a given target than necessary to achieve a position solution; for example, as described later, while only range, azimuth angle, and elevation angle may be necessary to calculate object position, composite angle may also be calculated and used to refine and/or check azimuth/elevation angle calculations.

Further, while S130 primarily includes calculating tracking parameters from the reflected probe signals, S130 may additionally or alternatively calculate or otherwise receive parameters relevant to object tracking (e.g., radar egomotion velocity) that are not calculated using the probe signal.

Parameters used to establish target position may be defined in any coordinate system and base. In the present application, target position is preferably represented in a Cartesian coordinate system with the origin at the radar (e.g., x,y,z represents target position) or a spherical coordinate system with the same origin, wherein position is defined by range (R), azimuth (α), and elevation (θ); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The method 100 may include calculating any such angles.

While, as previously mentioned, any parameters relevant to object tracking may be calculated in S130, some additional parameters that may be calculated include target range rate (dR/dt, typically calculated from Doppler data), relative target velocity (the velocity of the target with respect to the radar receiver), radar egomotion velocity (referred to in this application as egovelocity, the velocity of the radar receiver relative to a stationary position). These may be related; for example, range rate is equivalent to relative target velocity multiplied by the cosine of the looking angle between the radar and the target.

Figure 9:
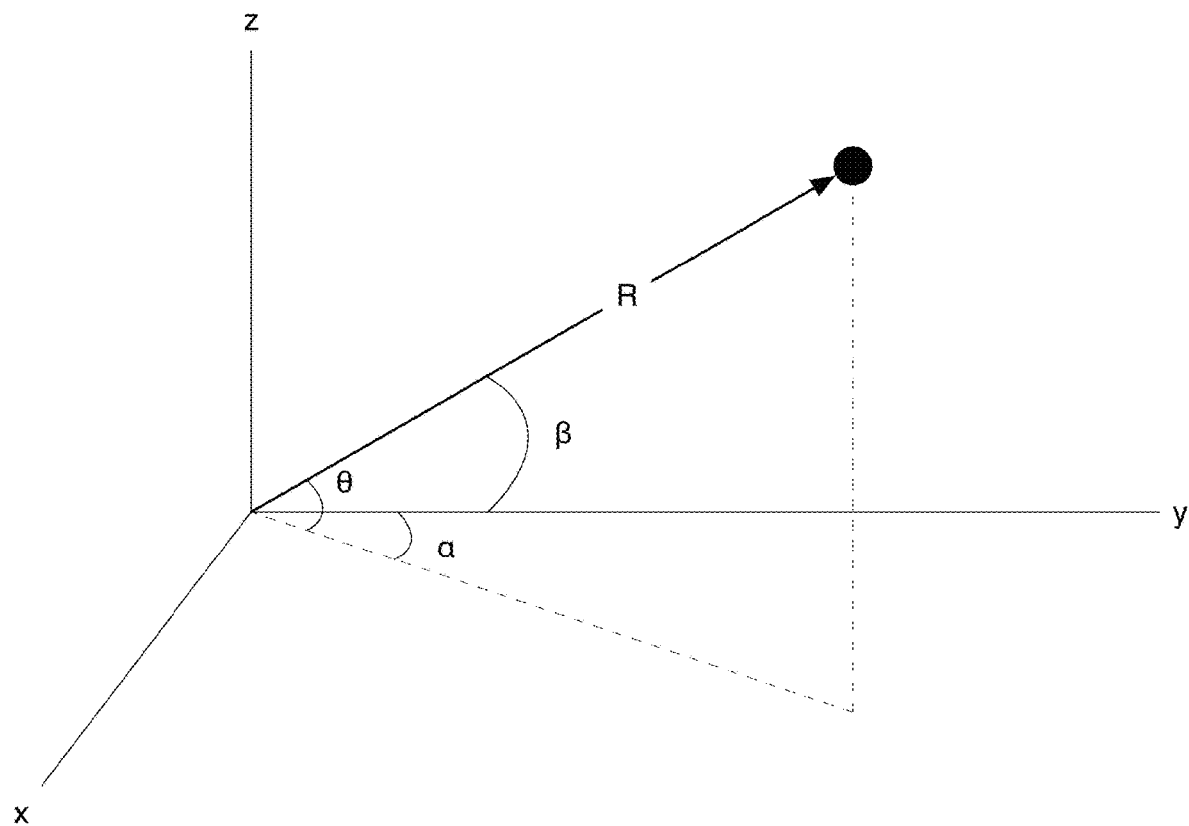
FIG. 9 is a Cartesian coordinate view of object position parameters.

S130 may additionally or alternatively include calculating composite angle (β, the angle between the target and the radar: β=arccos[cos α×cos θ], see also FIG. 9). While composite angle may be derived from elevation and azimuth (or vice versa), it may also be calculated from Doppler data. If, for example, elevation and azimuth are calculated from a first data source (e.g., phase differences between receivers in a receiver array) and composite angle is calculated from a second data source (e.g., Doppler frequency shift and relative velocity), composite angle can be used alongside elevation and azimuth to produce a more accurate solution.

S130 may include calculating tracking parameters from any suitable data source. For example, operating on a radar system with a horizontal receiver array, azimuth may be calculated based on phase differences between the reflected probe signal seen by each receiver in the array. Likewise, elevation may be calculated in a similar manner by a vertical receiver array (and/or elevation and azimuth may be calculated in similar manners by a two-dimensional receiver array). Range, for example, may be calculated based on travel time of a probe signal. Range rate, for example, may be calculated instantaneously (e.g., using Doppler frequency shift data) or over time (e.g., by measuring change in range over time). Composite angle, as previously discussed, may be derived from elevation/azimuth or calculated explicitly from Doppler data: $f_D \approx Kv \cos \beta$;

$$K = 2\frac{f_0}{c}.$$

S130 may additionally include calculating relative target velocity in any manner. For example, S130 may include determining that a target is stationary and calculating relative target velocity based on egovelocity (i.e., in this case, relative target velocity is egovelocity). A target may be determined as stationary in any manner; for example, by identifying the target visually as a stationary target (e.g., a stop sign may be identified by its appearance), by identifying the target by its radar cross-section as a stationary target (e.g., a stop sign or a road may be identified by shape or other features), by comparing Doppler data to other (e.g., phase) data (e.g., if the composite angle provided by Doppler data is substantially different from the composite angle derived from elevation and azimuth, that may be a moving target), by the size of the target, or in any other manner. Likewise, egovelocity may be determined in any manner (e.g., a GPS receiver or IMU coupled to the position of the radar receiver, external tracking systems, etc.). As another example, S130 may include receiving relative target velocity information based on external data; e.g., an estimate from a visual tracking system coupled to the position of the radar receiver. Relative target velocity information may even be provided by an external tracking system or the target itself (e.g., transmissions of IMU data from a target vehicle).

To determine Doppler frequency shift, S130 may include converting reflected signal data to the frequency domain using a Fast Fourier Transform (or any other technique to convert time domain signals to frequency domain for analysis). S130 may also improve system performance by using a Sliding Fast Fourier transform (SFFT) or similar techniques such as the Sliding Discrete Fourier Transform (SDFT) and Short-time Fourier Transform (STFT). These techniques allow Fourier transforms for successive samples in a sample stream to be computed with substantially lower computational overhead, improving performance.

S130 preferably includes calculating initial tracking parameters from two or more reflected probe signals by linking signal instances to receiver elements S131 and performing beamforming across receiver elements S132.

S131 includes linking signal instances to receiver elements. S131 functions to correspond signal instances received at a given receiver element to a real or virtual receiver element. For example, a radar system that time-duplexes first (zero-phase) and second (phase-shifted) signals may correspond a signal instance received at a physical receiver element either to that receiver element (if the reflected signal is the first signal) or to a shifted virtual receiver element (if the reflected signal is the second signal). Note that while in some cases the translation of virtual receiver elements is independent of target angle, in cases where the translation of virtual receiver elements depends upon target angle, it may be required to preliminarily determine target angle first (in order to know the position of virtual receiver elements) using one or more subsets of received signals (each subset corresponding to one of the unique transmitted signals) independently prior to using all received signals jointly. Alternatively stated, the virtual elements may be described in terms of the physical elements by an element translation function; if this translation function is not already known (as in the case of separated transmitters) S131 may include determining the element translation function for a given target.

S132 includes performing beamforming across receiver elements. Once data has been linked to real or virtual receiver element positions, S132 functions to calculate object tracking data (e.g., target range and angle) using beamforming techniques. Beamforming techniques that may be used by S132 include but are not limited to conventional (i.e., Bartlett) beamforming, Minimum Variance Distortionless Response (MVDR, also referred to as Capon) beamforming, Multiple Signal Classification (MUSIC) beamforming, or any other beamforming technique.

S132 preferably includes performing digital beamforming for a given object-tracking element array using every element (both real and virtual) in the array, but S132 may additionally or alternatively use any subset of elements to perform angle calculations. In some embodiments, S132 may include dynamically selecting the receiver elements used to perform digital beamforming techniques (e.g., based on receiver noise or any other relevant factor).

S140 includes refining the initial tracking parameters. S140 functions to generate a more accurate tracking solution than that initially calculated by S130. In a first example implementation, S140 includes running a Kalman filter on Cartesian coordinates of a target generated from elevation angle or azimuth angle (determined from phase information), range, and composite angle, constrained by error bounds of the composite angle. In a second example implementation, S140 includes running a Kalman filter on Cartesian coordinates of a target generated from elevation angle and azimuth angle (determined from phase information), range, and composite angle constrained by error bounds of the composite angle.

S140 may additionally or alternatively include filtering, refining, and/or constraining tracking parameters in any manner.

S150 includes modifying probe signal characteristics. S150 functions to modify characteristics of the transmitted probe signals to ensure high performance of the radar tracking algorithm. One of the advantages of the method 100 is that virtual transmitter/receiver elements can be added (and the virtual aperture expanded) or removed at will. Adding more virtual elements increases the potential accuracy of object tracking performed by the method 100, but also increases the latency of object tracking.

S150 may include modifying probe signal characteristics based on the output of S130; for example, if during object tracking it is detected that a first set of data (corresponding to an earlier-transmitted signal and real receivers, for example) and a second set of data (corresponding to a later-transmitted signal and virtual receivers) fail to converge upon an object tracking solution within some threshold error bounds, S150 may include modifying the transmitted signal to reduce the number of virtual elements (e.g., reducing the number of distinct phase-encoded signals from three to two).

S150 may alternatively include modifying probe signal characteristics based on other data. For example, S150 may include modifying probe signal data based on radar array motion (e.g., the speed of an automobile for a car-mounted radar); modifying transmission to increase virtual aperture when the car is moving more slowly and modifying transmission to decrease virtual aperture when the car is moving more quickly.

S150 may additionally or alternatively include modifying probe signal characteristics (at either transmitter or receiver) in any manner.

2. System for Virtual Aperture Array Radar Tracking

Figure 10:
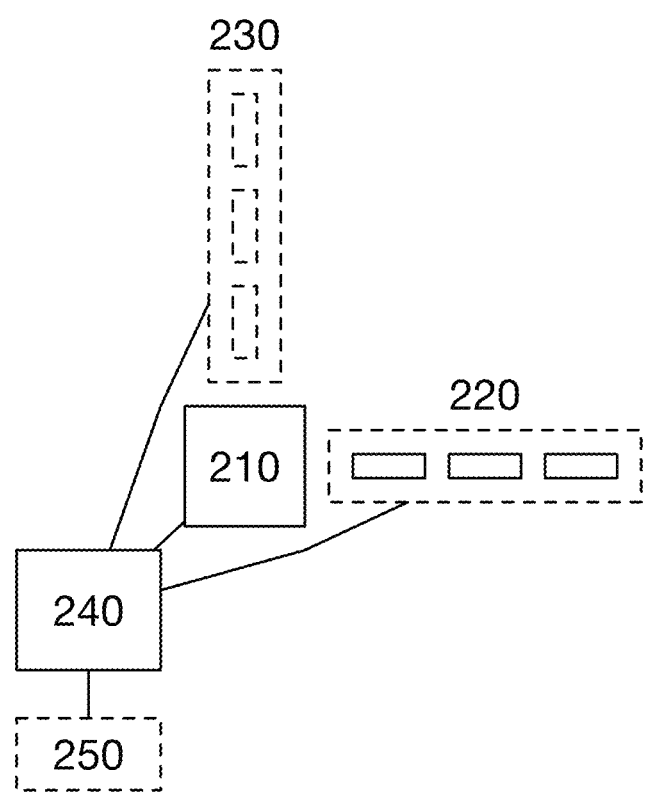
FIG. 10 is a diagram view of a system of an invention embodiment.

A system 200 for virtual aperture array (VAA) radar tracking includes a transmitter 210, a horizontal receiver array 220, and a signal processor 240, as shown in FIG. 10. The system 200 may additionally include a vertical receiver array 230 and/or a velocity sensing module 250.

Figure 11:
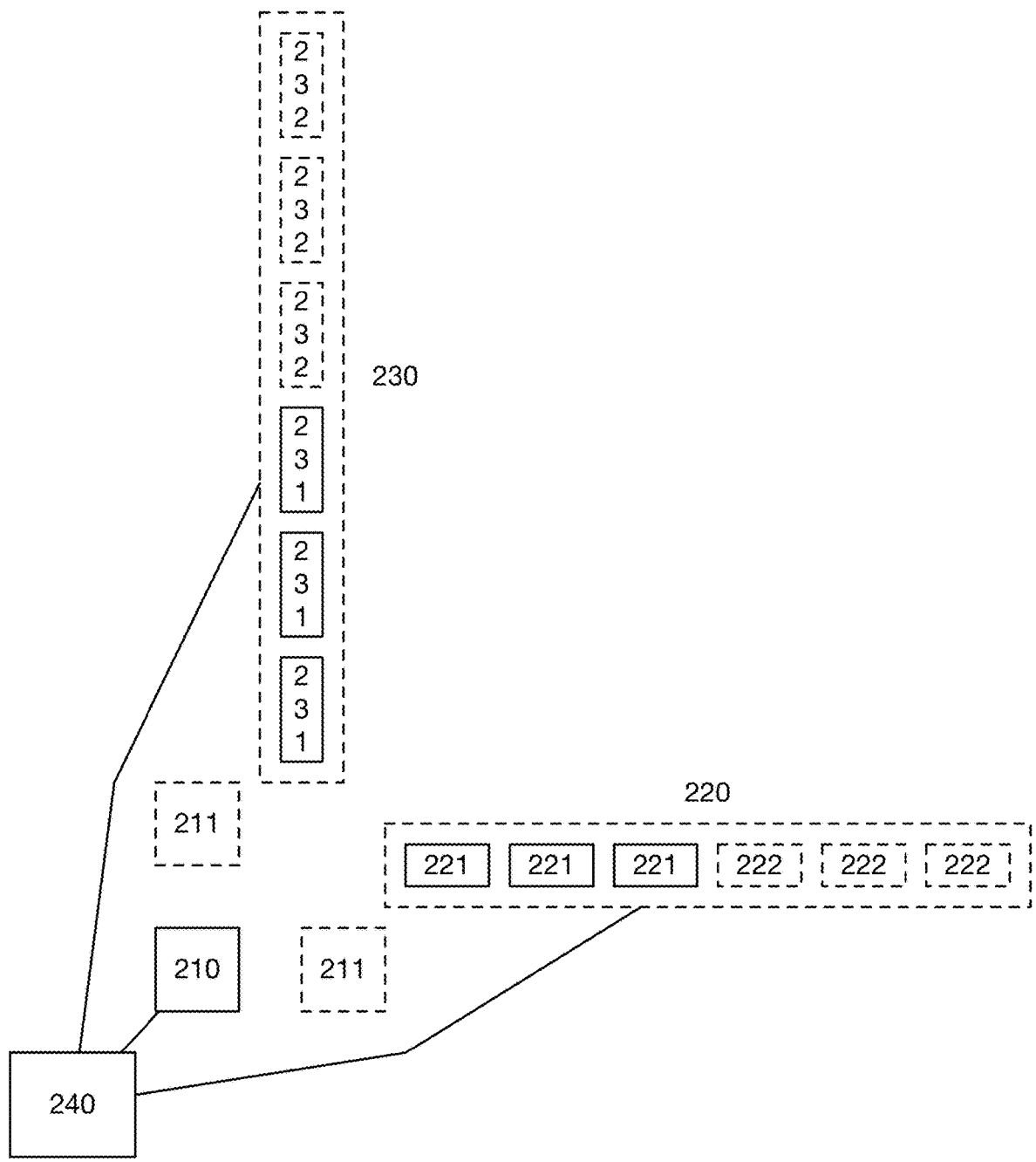
FIG. 11 is a diagram view of a system of an invention embodiment.

Further, the system 200 may include any number of virtual transmitters 211 and/or virtual receiver elements 222/232, as shown in FIG. 11.

Similarly to the method 100, the system 200 utilizes VAA radar tracking to simulate increased radar aperture (as SAR does) without incurring the additional cost/size of increasing physical array size or the heavy downsides of SAR (e.g., motion data requirements and high processing latency).

The VAA radar tracking technique of the system 200 functions by capturing instances of a first signal at a physical array simultaneously (like a traditional phased array), then capturing instances of a second signal at the same physical array (the instances of the second signal captured simultaneously, but not necessarily at the same time as the instances of the first signal are captured); if applicable, capturing additional instances in the same manner, and finally processing the data received from all captured instances together to generate a higher-resolution radar tracking solution than would otherwise be possible. Notably, the first and second signals (as well as any additional signals) are encoded with distinct phase information. This distinct phase information enables the instances of the second signal to be treated as being received at a virtual receiver array displaced from the physical array (creating a virtual aperture larger than the physical aperture). For example, a first signal may be captured as shown in FIG. 4A, having a first phase encoding, and a second signal may be captured as shown in FIG. 4B, having a second phase encoding; these signals may be processed together as shown in FIG. 4C.

The transmitter 210 functions to transmit a signal that, after reflection by a target, can provide information about the target (e.g., relative location, velocity, etc.). The transmitter 210 preferably transmits a frequency shift keyed (FSK) RADAR signal or a frequency-modified continuous wave (FMCW) RADAR signal, but the transmitter 210 may transmit any signal satisfying these constraints; e.g., an electromagnetic signal (as in radio waves in RADAR, infrared/visible/UV waves in LIDAR), a sound signal (as in SONAR).

The transmitter 210 preferably has a single transmitting element (e.g., a single transmit antenna), but may additionally or alternatively have multiple transmitting elements (e.g., as in a radar array). If the transmitter 210 has multiple elements, these elements may include a single transmitter paired to multiple antennas (e.g., spaced in a particular pattern and/or with antennas coupled to phase/time delays); multiple transmitters, each paired to a single antenna; multiple transmitters paired to multiple antennas, or any other configuration.

In addition to the transmitter 210, the system 200 may additionally include any number of virtual transmitters 211. As described in the section of the method 100, virtual transmitters are created by phase-shifting the output of one or more real transmitters 210 and may correspond to a translated element of the transmitter 210.

The horizontal receiver array 220 functions to receive data resulting from the reflection of the probe signal(s) transmitted by the transmitter 210. The horizontal receiver array 220 preferably measures phase, magnitude, and frequency information from reflected probe signals, but the horizontal receiver array 220 may additionally or alternatively measure any available characteristics of the reflected probe signals.

From data received from the horizontal receiver array 220, tracking parameters relating to a tracking target may be calculated. The horizontal receiver array 220 is preferably used to determine azimuth ($\alpha$), as shown in FIG. 9, but parameters used to establish target position may be defined in any coordinate system and base, and the horizontal receiver array 220 may be used to determine any relevant tracking parameters. In the present application, target position is preferably represented in a Cartesian coordinate system with the origin at the radar (e.g., x,y,z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The system 100 may calculate any such angles.

The horizontal receiver array 220 includes a set of receiver elements 221 arranged in a pattern; e.g., along a horizontal axis. The set of receiver elements 221 may include a single receiver paired to multiple antennas (e.g., spaced in a particular pattern and/or with antennas coupled to phase/time delays); multiple receivers, each paired to a single antenna; multiple receivers paired to multiple antennas, or any other configuration.

The horizontal receiver array 220 may additionally include any number of virtual receiver elements 222. As described in the section of the method 100, virtual receiver elements 222 are created in response to the phase-shifting of output of one or more real transmitters 210 and may correspond to a translated receiver element 221 of the horizontal receiver array 220.

The horizontal receiver array 220 preferably is used to calculate angles from phase information, but may additionally or alternatively be used to calculate angles in any manner (e.g., using horizontal component of Doppler frequency shift).

The vertical receiver array 230 is preferably substantially similar to the horizontal receiver array 220, except that the vertical receiver array is arranged upon an axis not parallel to the axis of the horizontal receiver array (e.g., a vertical axis). The vertical receiver array 230 is preferably used to calculate elevation, but may additionally or alternatively be used to calculate any tracking parameters. The vertical receiver array 230 includes a number of receiver elements 231 and may additionally include any number of virtual receiver elements 232. As described in the section of the method 100, virtual receiver elements 232 are created in response to the phase-shifting of output of one or more real transmitters 210 and may correspond to a translated receiver element 231 of the vertical receiver array 230.

The signal processor 240 functions to calculate tracking parameters from data collected by the horizontal receiver array 220, the vertical receiver array 230, and/or the velocity sensing module 250. The signal processor 240 preferably includes a microprocessor or microcontroller that calculates tracking parameters according to the method 100; additionally or alternatively, the signal processor 240 may calculate tracking parameters in any manner. The signal processor 240 may additionally or alternatively be used to communicate with an external computer (e.g., to offload computations, receive additional data, or for any other reason). The signal processor 240 may also control configuration of the components of the system 200 or any calculations or actions performed by the system 200. For example, the signal processor 240 may be used to control creation and/or other parameters of virtual transmitters or virtual array elements as described in the section of the method 100.

The velocity sensing module 250 functions to determine the velocity of the system 200 (or components of the system 200, or an object coupled to the system 200). The velocity sensing module is preferably a communications interface that couples to an inertial measurement unit (IMU), but may additionally or alternatively be any communications interface (e.g., Wi-Fi, Ethernet, ODB-II) or sensor (accelerometer, wheel speed sensor, IMU) capable of determining a speed and/or velocity.

The methods of the preferred embodiment and variations thereof can be embodied and/or implemented at least in part as a machine configured to receive a computer-readable medium storing computer-readable instruction. The instructions are preferably executed by computer-executable components preferably integrated with a system for VAA radar tracking. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for virtual aperture array radar tracking comprising:
    a transmitter that transmits a first probe signal and a second probe signal, the first probe signal having a first phase function and the second probe signal having a second phase function different from the first phase function;
    a receiver array, comprising a first plurality of radar elements, that receives a first reflected probe signal in response to reflection of the first probe signal by a tracking target, and that receives a second reflected probe signal in response to reflection of the second probe signal by the tracking target; wherein the first plurality of radar elements comprises a first receiver element and a second receiver element, wherein the first and second receiver elements are arranged along a first array vector; wherein the tracking target and radar array cooperatively define a target vector from the radar array to the tracking target; and
    a signal processor that calculates a target range based on at least one of the first or second reflected probe signals, corresponds signal instances of the first reflected probe signal to a set of physical receiver elements of the radar array, corresponds signal instances of the second reflected probe signal to a set of virtual elements of the radar array, calculates a first target angle between a first reference vector and a first projected target vector based on the first and second reflected probe signals, and calculates a position of the tracking target relative to the radar array based on the target range and the first target angle; wherein the first projected target vector is the projection of the target vector onto a first reference plane, the first reference plane containing the first array vector and the first reference vector; wherein the set of physical receiver elements comprises the first and second receiver elements.

2. The system of claim 1, wherein each radar element of the first plurality is substantially arranged along the first array vector.

3. The system of claim 1, wherein:
    the system defines an element translation function; and
    for each physical receiver element of the set of physical receiver elements, the physical receiver element is associated with a respective virtual element of the set of virtual elements, wherein the respective virtual element is displaced from the physical receiver element based on the element translation function.

4. The system of claim 3, wherein the element translation function is a constant vector-valued function equal to a translation vector.

5. The system of claim 4, wherein the transmitter comprises a first transmit element and a second transmit element, wherein the second transmit element is displaced from the first transmit element by the translation vector.

6. The system of claim 1, wherein:
    the first probe signal is transmitted during a first time period; and
    the second probe signal is transmitted during a second time period non-overlapping with the first time period.

7. The system of claim 6, wherein:
    the first probe signal is transmitted beginning at a first time;
    the second probe signal is transmitted beginning at a second time; and
    a difference between the first phase function, referenced to the first time, and the second phase function, referenced to the second time, varies with time.

8. The system of claim 1, wherein the first phase function varies with time.

9. The system of claim 1, wherein the signal processor modifies at least one of the first and second probe signals in response to calculated position data, comprising modifying the at least one of the first and second probe signals to add virtual elements to the radar array.

10. The system of claim 1, wherein:
    the receiver array further comprises second plurality of radar elements, wherein the radar elements of the second plurality are substantially arranged along a second array vector non-parallel with the first array vector, wherein the set of physical receiver elements further comprises the second plurality of radar elements;
    the signal processor calculates a second target angle between the first reference vector and a second projected target vector based on the first reflected probe signal; wherein the second projected target vector is the projection of the target vector onto a second reference plane, the second reference plane containing both of the second array vector and the first reference vector;
    the signal processor calculates the position of the tracking target based further on the second target angle.

11. The system of claim 10, wherein the second plurality of radar elements comprises the first receiver element and a third receiver element.

12. A method for virtual aperture array radar tracking, comprising:
    at a transmitter of a radar array, transmitting a first probe signal having a first phase function;
    at the transmitter, transmitting a second probe signal having a second phase function different from the first phase function;
    in response to generation of a set of reflected signals via reflection of the first and second probe signals by a tracking target in an environment surrounding the radar array, at a receiver of the radar array, receiving the set of reflected signals, wherein the set of reflected signals comprises a first reflected signal and a second reflected signal;
    corresponding signal instances of the first reflected signal to a set of physical receiver elements of the radar array;
    corresponding signal instances of the second reflected signal to a set of virtual elements of the radar array;
    based on the set of reflected signals, determining a target range equal to a magnitude of a target vector from the radar array to the tracking target;
    based on the set of reflected signals, determining a target angle between a first reference vector and a first projected target vector, wherein the first projected target vector is the projection of the target vector onto a first reference plane, the first reference plane containing the first reference vector and a first array vector defined by the radar array; and based on the target range and the target angle, determining a position of the tracking target relative to the radar array.

13. The method of claim 12, wherein:
the first reflected signal is generated via reflection of the first probe signal by the tracking target; and
the second reflected signal is generated via reflection of the second probe signal by the tracking target.

14. The method of claim 13, wherein receiving the set of reflected signals comprises receiving the first and second reflected signals concurrently.

15. The method of claim 14, wherein:
the receiver comprises a first receiver element and a second receiver element; and
receiving the first and second reflected signals concurrently comprises:
receiving the first reflected signal at the first receiver element; and
receiving the second reflected signal at the second receiver element.

16. The method of claim 14, wherein:
the transmitter comprises a first transmit element and a second transmit element;
transmitting the first probe signal is performed at the first transmit element; and
transmitting the second probe signal is performed at the second transmit element, wherein the first and second probe signals are transmitted concurrently.

17. The method of claim 12, wherein:
the transmitter comprises an array of transmit elements; and
the transmitter transmits the first probe signal by independently modulating the phases of each transmit element of the array.

18. The method of claim 17, wherein the phases of the array of transmit elements are modulated with respect to a beam steering angle.

19. The method of claim 12, wherein a difference between the first and second phase functions varies with time.

20. The method of claim 12, further comprising:
based on at least one of the target range or the target angle, determining a modified set of probe signals to add at least one virtual element to the radar array;
at the transmitter, transmitting the modified set of probe signals;
in response to generation of a second set of reflected signals via reflection of the modified set of probe signals by the tracking target, at the receiver, receiving the second set of reflected signals;
based on the second set of reflected signals, determining an updated target range;
based on the second set of reflected signals, determining an updated target angle; and
based on the updated target range and the updated target angle, determining an updated position of the tracking target relative to the radar array.

* * * * *